United States Patent
Green

[15] 3,634,937
[45] Jan. 18, 1972

[54] APPARATUS AND METHOD FOR DENTAL OPERATIONS

[72] Inventor: Edward J. Green, 11900 Shaker Blvd., Shaker Heights, Ohio 44120

[22] Filed: May 22, 1970

[21] Appl. No.: 39,632

[52] U.S. Cl. .................................................32/1, 32/71
[51] Int. Cl. .....................................................A61c 19/00
[58] Field of Search .........................206/72, DIG. 29; 32/1

[56] References Cited

UNITED STATES PATENTS

| | | | |
|---|---|---|---|
| 3,285,409 | 11/1966 | Loran | 206/72 |
| 2,485,051 | 10/1949 | Joslin | 206/DIG. 29 |
| 3,467,247 | 9/1969 | Weiss | 206/72 |
| 3,272,371 | 9/1966 | Weiner | 206/72 |

Primary Examiner—Robert Peshock
Attorney—Meyer, Tilberry and Body

[57] ABSTRACT

An apparatus and method for performing dental operations includes provided, kit defined by a sterilizable metal tool tray, an accessory tray for holding accessories to be used in performing a predetermined dental operation and a set of tools for use in performing the predetermined dental operation. Each tool in the set and each tray is provided with a common color identification symbol. A plurality of such kits may be provided with each kit containing tools and accessories for performing a different dental operation. Each kit then has a different color identification. An untrained assistant can readily locate and position the proper kit for performing a particular dental operation by means of the common color identification. Tools are easily returned to a proper tray after washing and sterilization by means of the common color identification.

13 Claims, 13 Drawing Figures

PATENTED JAN 18 1972

INVENTOR.
EDWARD J. GREEN
BY Meyer, Tilberry & Body
ATTORNEYS

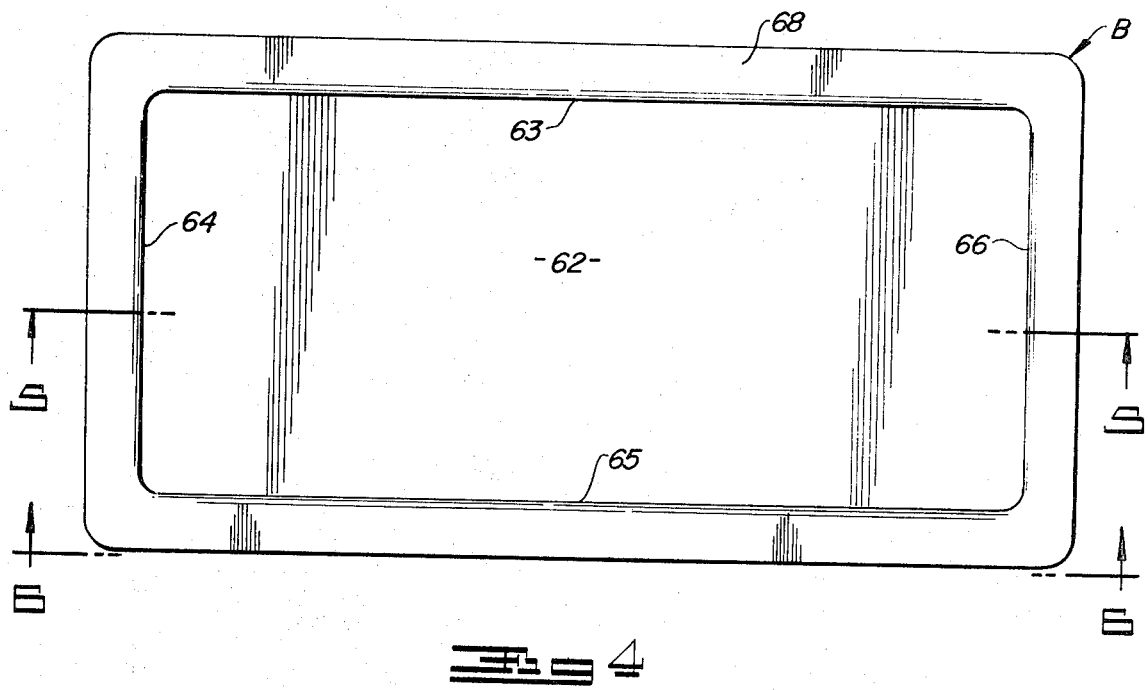
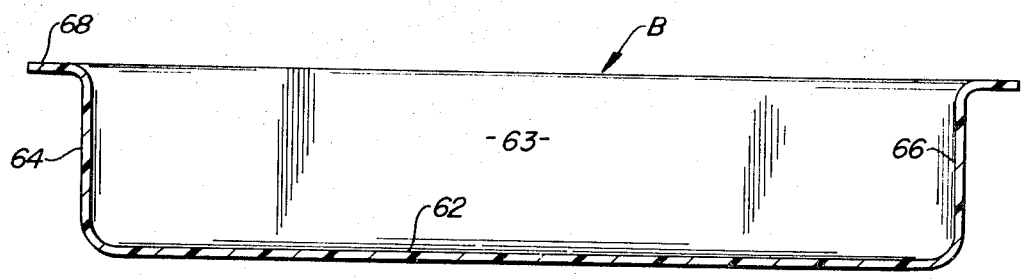
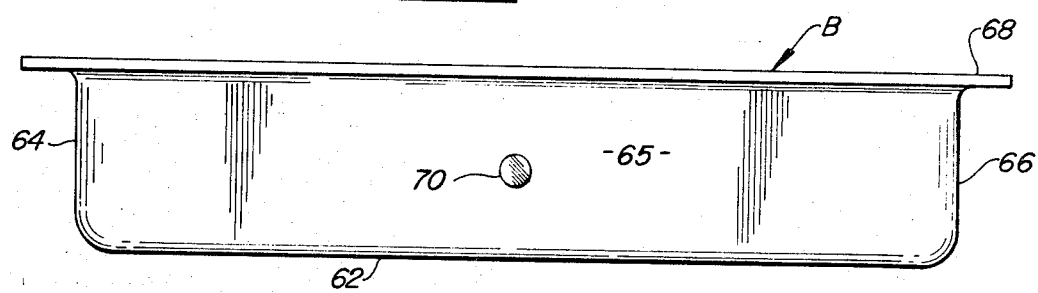

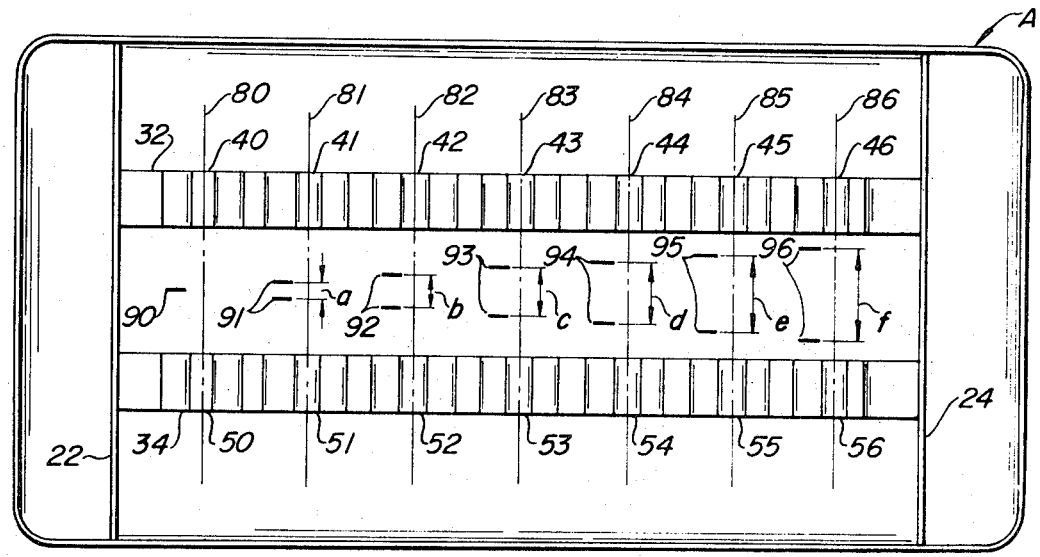
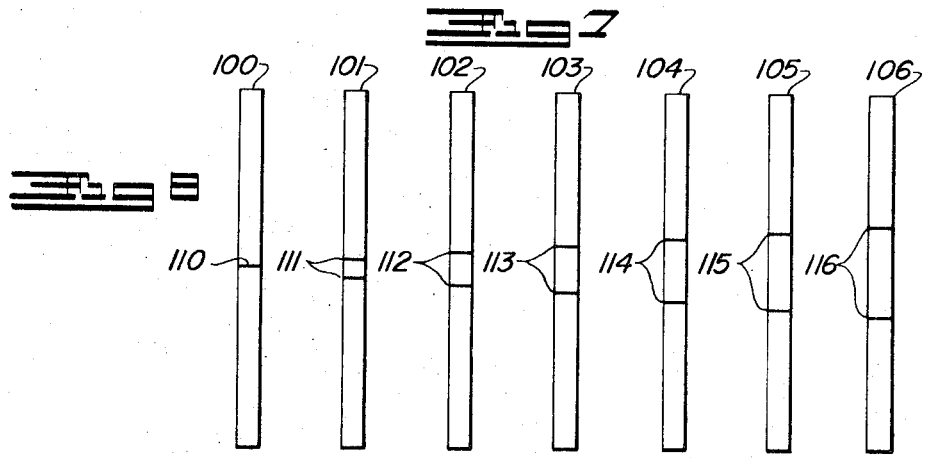
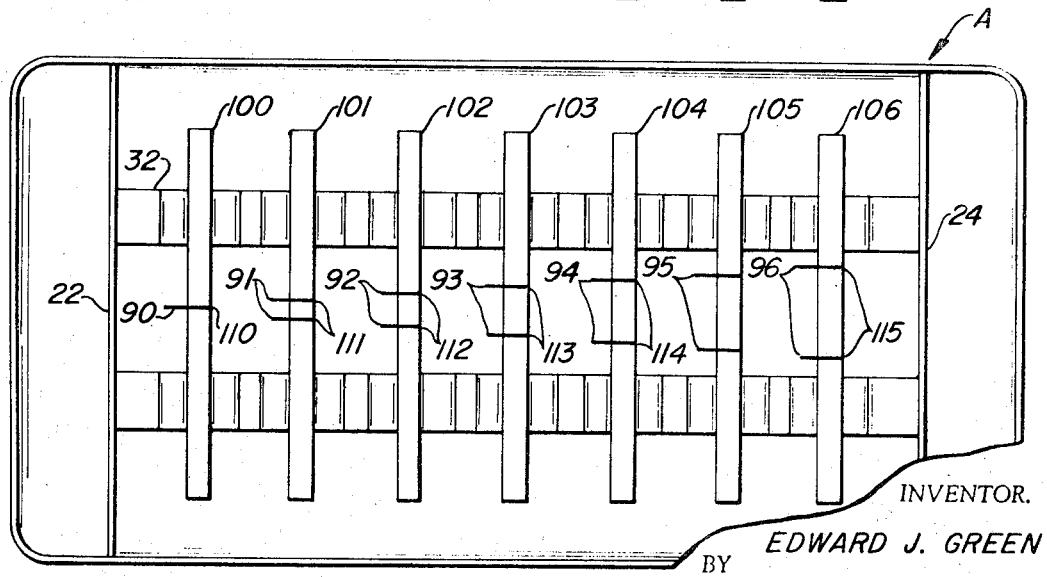

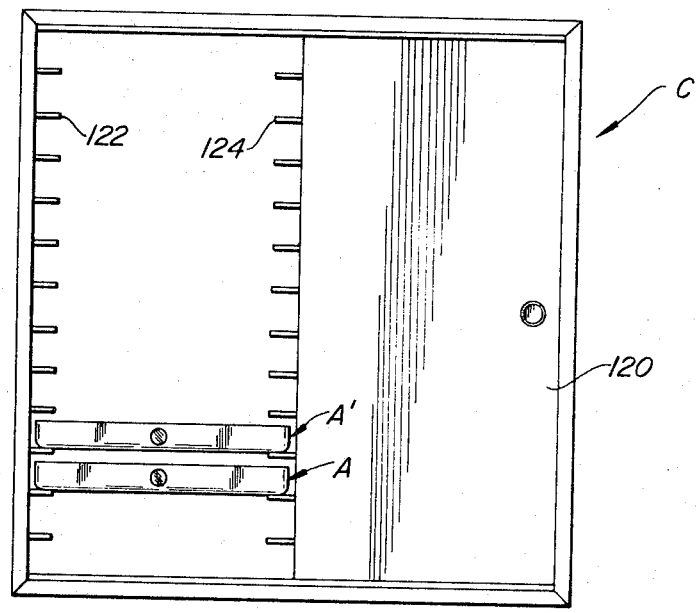
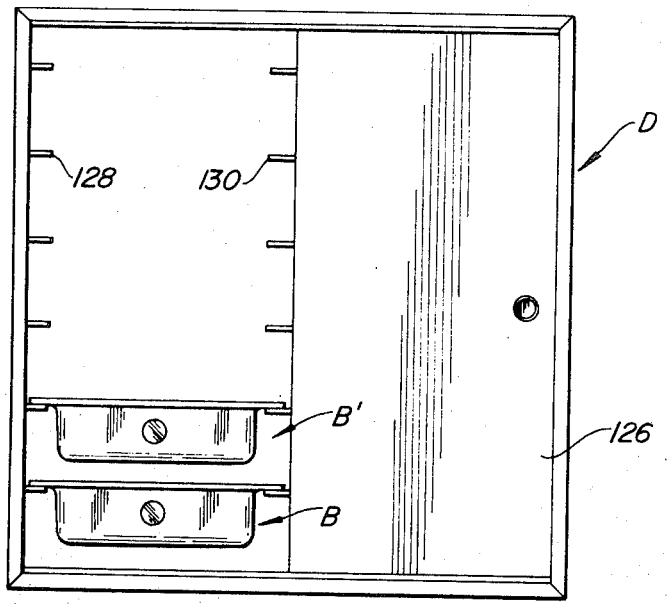

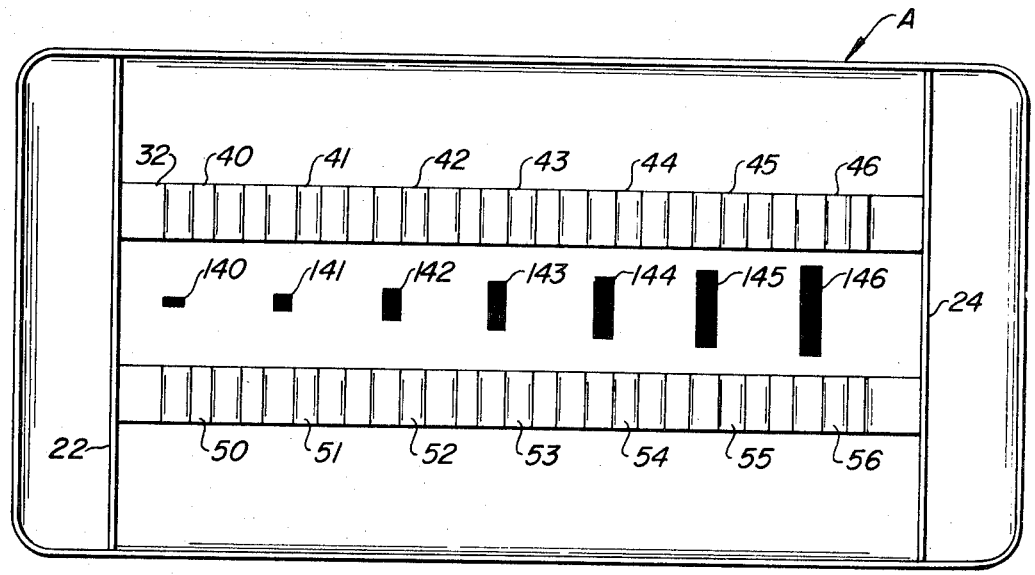
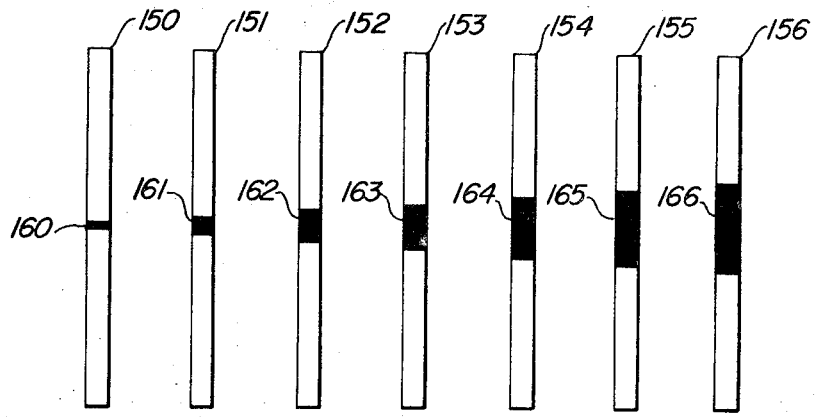

3,634,937

APPARATUS AND METHOD FOR DENTAL OPERATIONS

BACKGROUND OF THE INVENTION

This application pertains to the art of dentistry and more particularly to an apparatus and method for performing dental operations. While the invention is particularly applicable to dental operations and will be described with particular reference thereto, it will be appreciated that the invention has broader applications and may be used in other medical fields.

Dental operating offices are commonly supplied with a plurality of tool sets for performing dental operations. A plurality of identical tool sets are often provided so that a successive number of identical operations may be performed on different patients without requiring resterilization of a single set of tools for all patients. Also, sets of different tools are provided for performing different operations. In addition to the various tools, certain accessories are often provided.

A dentist performs his work in a limited area which provides access to a patient's oral cavity. All activities which require a dentist to move from this area are inefficient. Therefore, dentists commonly have assistants who move around outside of the prime work area to obtain tools and accessories for the dentist. A cabinet or other supporting surface is normally located adjacent the primary work area. The necessary tools and accessories for performing a particular operation are located on the support for easy access by the dentist and his assistant without requiring them to move out of the primary work area during an operation. While a dentist is completing work on one patient, he may request his assistant to prepare either the same primary work area or another for performing a particular operation on his next scheduled patient. A highly skilled assistant is familiar with the tools and accessories required for any particular operation. Therefore, a highly skilled assistant may easily locate the proper tools and accessories and position them within reach of the prime work area so that the next operation may proceed without delay. Any additional instructions or assistance a dentist must give to his assistant greatly reduces his efficiency and either removes him from the primary work area or interrupts his work within that area. Highly skilled assistants are difficult to find and their turnover rate is quite high. Therefore, a dentist may work inefficiently for one year while training a new assistant only to have the assistant leave just at the point optimum skills have been acquired. Therefore, it would be desirable to eliminate the inefficiencies associated with inexperienced assistants.

SUMMARY

In accordance with the present invention, an improved apparatus and method is provided for performing dental operations so that an unskilled assistant may be of optimum assistance to a dentist without reducing his efficiency and require an absolute minimum of instruction. In accordance with the invention, a dental operating kit includes a sterilizable metal tool tray, a set of dental tools for performing a predetermined dental operation and a nonmetallic accessory tray for receiving accessories to be used in performing the predetermined operation. The tool tray, accessory tray and each tool in the set of tools is provided with a common color identification symbol. The color identification symbol is coded to a predetermined dental operation. Therefore, when a dentist requests an assistant to prepare the operating area for a certain operation, the dentist may simply inform the assistant of a color or the assistant may check an alphabetical card index of operations to find the color code for that operation. The assistant then simply locates the sterilizable metal tool tray and the accessory tray having the color code for the operation to be performed. Such trays are preferably stored in cabinets and are already provided with the necessary tools and accessories for the particular operation to be performed. When tools are removed from any tray for cleaning and sterilization, an unskilled assistant may readily place them back in the proper tray due to the common color identification on each tool and tray. In addition, the card index is provided to identify the accessories required for each type of operation. An unskilled assistant may then readily maintain accessory trays supplied with necessary accessories.

In a preferred arrangement, each sterilizable metal tool tray includes a plurality of spaced-apart tool-supporting stations. The common color identification symbol is located in a different arrangement adjacent each of the tool-supporting stations. The color identification symbol on each tool in a set is also located in a different arrangement, with each identification symbol on each tool corresponding to one of the identification arrangements adjacent the tool-supporting stations. With this plan, tools are positioned in a tray in a predetermined order corresponding to the order in which each tool is normally used during an operation. Once all tools in a set have been cleaned and sterilized, an untrained assistant may readily position the tools back in proper order by matching an identification symbol on each tool with a corresponding identification symbol adjacent a tool-supporting station.

With the apparatus of the present invention, it is possible to utilize an improved method of training a dental assistant in operating procedures. Within a dental operating office, there are provided a plurality of tool trays and a plurality of accessory trays. A first of the tool trays is provided with a first set of tools for performing a first type of dental operation. A second of the tool trays is provided with a second set of tools for performing a second type of dental operation. A first of the accessory trays is provided with accessories for use in performing the first type of dental operation, while the second accessory tray is provided with accessories for use in performing the second type of dental operation. Each of the first trays is provided with a common first color identification symbol, and each of the second trays is provided with a common second color identification symbol. When a dentist requests an assistant to make the operating area ready for a particular type of operation, he may either tell his assistant the color symbol, or may simply tell the assistant the operation and the color can then be checked on an index card. The assistant then simply must locate the tool tray and accessory tray having the color symbol for that particular operation and position those tools on a support surface adjacent the primary work area. A plurality of instruction cards having a color identification symbol corresponding to those on the trays and tools for each operation may also be provided so that an unskilled assistant may briefly review what is normally done during that type of operation.

In accordance with a further aspect of the invention, each tool in the first set of tools is provided with the first color identification symbol, and each tool in the second set of tools is provided with the second color identification symbol. Each tool tray may also be provided with a color identification symbol adjacent each tool-supporting station. Each tool in a particular set of tools is then provided with a color identification symbol corresponding to the color identification arrangement adjacent one tool-supporting station. With this arrangement, a plurality of different tool sets may be provided and an assistant may readily return each tool from a sterilizer to its proper location in a tray by the coded color identification. With the improved apparatus and method of the present invention, an unskilled assistant provides optimum assistance to a dentist with a minimum of instruction and without reducing the efficiency of the dentist.

It is a principal object of the present invention to provide an improved apparatus for performing dental operations.

It is also a principal object of the present invention to provide an improved method of training unskilled assistants in dental operating procedures.

It is also an object of the present invention to provide an improved dental operating kit which includes a sterilizable metal tray, an accessory tray and a set of tools, with each of these items being provided with a common color identification symbol.

It is an additional object of the present invention to provide an improved identification arrangement for sterilizable metal tool trays and a set of tools by providing a common color identification on each tray and set of tools in such a manner that each tool may be returned to its proper position within a tray corresponding to the order in which each tool is customarily used in performing a particular operation.

It is a further object of the present invention to provide an improved apparatus and method for performing dental operations which enables an unskilled assistant to give optimum aid to a dentist without reducing his efficiency and with a minimum of instruction.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof.

FIG. 4 is a top plan view of an accessory tray for use with the improved apparatus and method of the present invention;

FIG. 5 is a cross-sectional elevational view looking in the direction of arrows 5—5 of FIG. 4;

FIG. 6 is a side elevational view looking in the direction of arrows 6—6 of FIG. 4;

FIG. 7 is a top plan view of the tray of FIG. 1 and further including identification symbols located adjacent tool supporting stations;

FIG. 8 is a plan view of a set of tools for use with the tray of FIG. 7;

FIG. 9 is a top plan view showing the tools of FIG. 8 positioned in the tray of FIG. 7;

FIG. 10 is a front elevational view of a cabinet for location in a dental operating room to support a plurality of trays as described with reference to FIGS. 1–3;

FIG. 11 is a front elevational view of a cabinet for location in a dental operating room to support a plurality of trays as described with reference to FIGS. 4–6;

FIG. 12 is a top plan view of a tray as described with reference to FIGS. 1–3 and including identification symbols adjacent each tool supporting station;

FIG. 13 is a top plan view of a set of tools for use with the tray of FIG. 12.

DESCRIPTION OF THE PREFERRED EMBODIMENT

Figure 1:
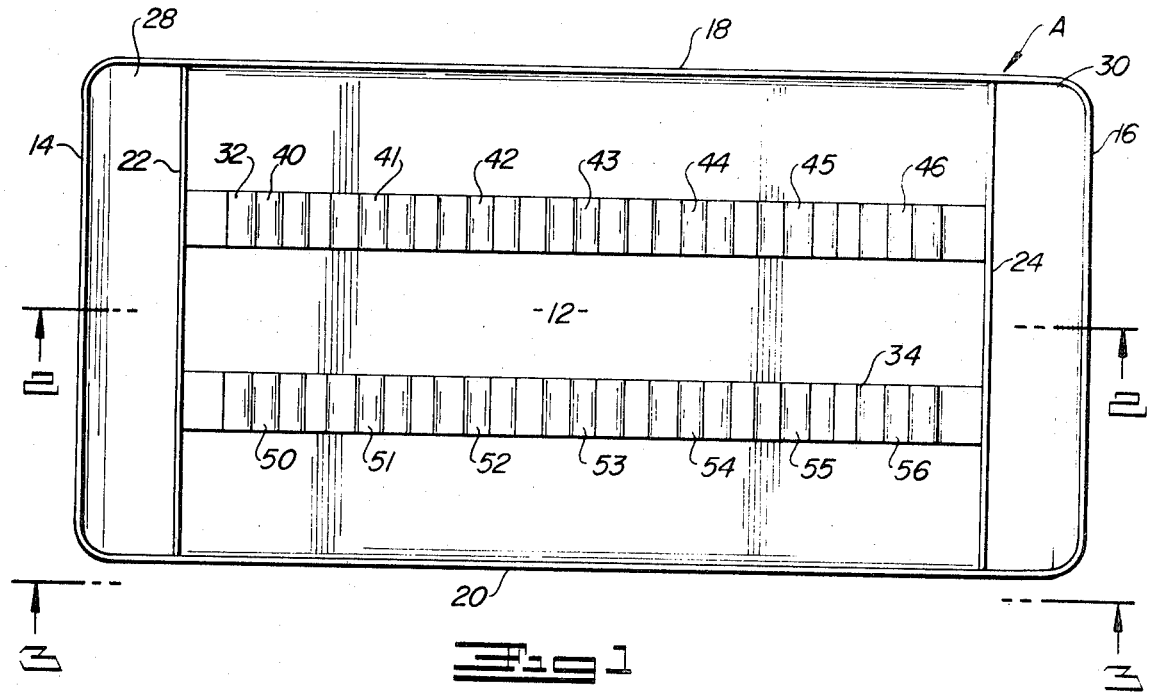
FIG. 1 is a top plan view of a metal tool tray for use with the apparatus and method of the present invention.
Figure 2:
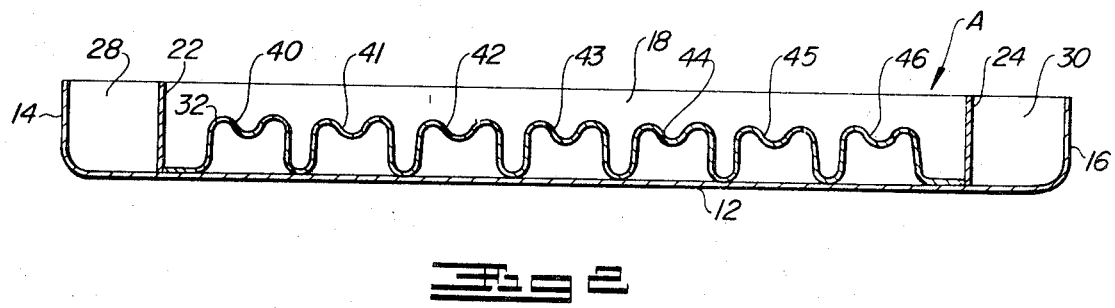
FIG. 2 is a cross-sectional elevational view looking in the direction of arrows 2—2 in FIG. 1.
Figure 3:
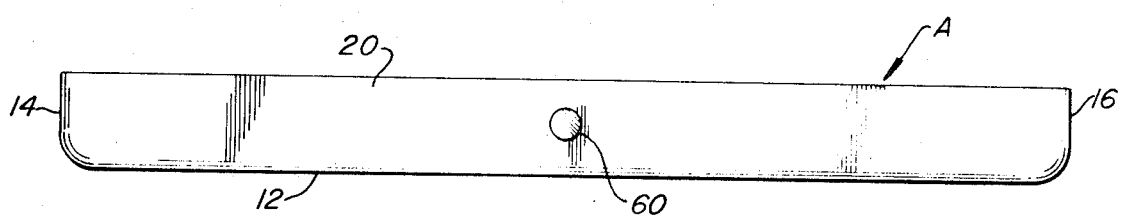
FIG. 3 is a side elevational view looking in the direction of arrows 3—3 in FIG. 1.

Referring now to the drawings, wherein the showings are for purposes of illustrating the preferred embodiment of the invention only and not for purposes of limiting same, FIG. 1 shows a sterilizable rectangular metal tray A. Tray A includes a bottom wall 12, and first and second spaced-apart sidewalls 14 and 16 upstanding from bottom wall 12. Tray A further includes third and fourth parallel spaced-apart sidewalls 18 and 20 upstanding from bottom wall 12, and extending perpendicular to first and second sidewalls 14 and 16. Tray A may be formed into its tray shape in a forming press from a rectangular sheet of aluminum in a known manner. Tray A is provided with first and second parallel spaced-apart divider members 22 and 24 extending completely across tray A from sidewall 18 to sidewall 20 parallel to sidewalls 14 and 16. As shown in FIG. 1, divider members 22 and 24 are spaced inwardly from sidewalls 14 and 16 respectively to define end compartments 28 and 30. Divider members 22 and 24 may be of aluminum and have rectangular cross-sectional shapes as shown in FIG. 2. The ends of divider members 22 and 24 may be welded or otherwise secured to the interior surfaces of sidewalls 18 and 20. It is also possible to weld or otherwise secure the bottom edges of divider members 22 and 24 to bottom wall 12 if so desired. A pair of aluminum rods 32 and 34, each having a rectangular cross-sectional shape similar to that of divider members 22 and 24, are formed into an undulating shape along their length as shown in FIG. 2. Members 32 and 34 define tool-supporting means within tray A and are positioned in parallel spaced-apart relationship parallel to sidewalls 18 and 20, and spaced inwardly therefrom as shown in FIG. 1. Each member 32 and 34 is bent to an undulating shape which provides a plurality of upwardly opening recesses. In the arrangement shown, member 32 is provided with 7 such recesses numbered 40 through 46, while member 34 also is provided with 7 such recesses numbered 50 through 56. The recesses in each member 32 and 34 are aligned. That is, recesses 40 and 50 are located along a common line extending parallel through sidewalls 14 and 16. Each of the other recesses in each member are also aligned to provide a plurality of spaced-apart pairs of recesses which define a plurality of spaced-apart tool-supporting stations. The end portions of members 32 and 34 may be welded to interior surfaces of divider members 22 and 24 adjacent the bottom edges thereof as shown in FIG. 2. The end portions of members 32 and 34 may also be welded to bottom 12 of tray A if so desired. Tray is also provided with a visible color identification symbol. This identification may be provided in a large number of different ways. For example, FIG. 3 shows color identification symbol 60 in the form of a circle painted on the exterior surface of sidewall 20. Symbol 60 may be painted on tray A with a high-temperature epoxy paint. It should be recognized that it is also possible to anodize aluminum tray A to a particular color. When a symbol such as 60 is provided, it will be recognized that it may be provided on the exterior surface of all four sidewalls of tray A. The color identification may be provided in a large number of shapes and forms. In addition, it is possible to anodize only the exterior surface of tray A a particular color with the interior surface thereof being left plain or simply anodized to a natural finish.

The operating kit of the present invention further includes a nonmetallic accessory tray B as shown in FIG. 4. Tray B includes a bottom wall 62, and sidewalls 63 through 66. The top portion of accessory tray B includes an outwardly extending peripheral flange 68 extending completely around tray B. Tray B is conventional and may be molded of synthetic plastic material such as polypropylene or polyvinylchloride. Accessory tray B is also provided with a color identification symbol such as indicated at 70 in FIG. 6. Symbol 70 may be painted onto the exterior surface of all four sidewalls of accessory tray B. In addition, the plastic material from which accessory tray B is molded may itself be colored so that the entire tray will be any desirable predetermined color.

In accordance with an important aspect of the invention, tray A is provided with color identification symbols interiorly thereof adjacent the tool supporting stations. In the arrangement shown in FIG. 7, parallel spaced-apart lines 80 through 86 represent a plurality of spaced-apart tool-supporting stations in tray A. The inner surface of bottom wall 12 on tray A is provided with a color identification symbol adjacent each tool-supporting station. In the arrangement of FIG. 7, the color identification symbol is defined by lines painted on bottom 12 intermediate tool-supporting means 32 and 34. In the arrangement shown, a first line 90 is provided between divider member 22 and tool-supporting station 80. A pair of lines 91 are provided between tool-supporting stations 81 and 81, and are spaced apart a predetermined distance "a." A pair of lines 92 are provided between tool-supporting stations 81 and 82, and are spaced-apart a predetermined distance "b" which is greater than distance "a." A pair of lines 93 are provided between tool-supporting stations 82 and 83, and are spaced-apart a predetermined distance "c" which is greater than distance "b." A pair of lines 94 are provided between tool supporting stations 83 and 84, and are spaced apart a predetermined distance "d" which is greater than distance "c." A pair of lines 95 are provided between tool-supporting stations 84 and 85, and are spaced apart a predetermined distance "e" which is greater than distance "d." A pair of lines 96 are provided between tool-supporting stations 85 and 86 are spaced apart a predetermined distance "f" which is greater than distance "e." In a preferred arrangement, lines 90–96 are located intermediate the tool-supporting stations so that they will be visible when tools are located in tray A. However, it will be recognized that lines 90–96 may be located directly at each tool-supporting station 80–86 so as to be covered by a tool when such tool is positioned at a supporting station. It will also be recognized that a large number of different identification arrangements may be provided either on tray A or on support members 32 and 34. In the arrangement shown and described, it will be recognized that lines 90–96 define a color identification in a different arrangement adjacent each tool-supporting station 80–86. That is, the different arrangement lies in the fact that the pairs of lines are spaced apart different differences adjacent each station. Obviously, any other arrangements may be provided in which a color identification symbol is in a different arrangement or shape adjacent each tool-supporting station.

A set of tools for positioning in tray A is shown in FIG. 8. The tool set of FIG. 8 may be for performing an amalgam dental operation. Tools normally used in such an operation, in order of use, include a mirror 100, an explorer 101, a small plugger 102, a large plugger 103, a broad carver 104, a fine carver 105 and a chisel 106. It will be recognized that a larger number of tools may be provided for this particular operation and only 7 tools have been described for brevity and simplicity of description. Each tool is provided with a color identification in a different arrangement and the arrangement on each tool corresponds to one color identification arrangement adjacent one tool supporting station in tray A. For example, mirror 100 has a centrally located ring 110 painted thereon. Explorer 101 has a pair of rings 111 painted thereon and spaced apart a distance which is the same as spacing "a" for lines 91. Small plugger 102 has a pair of rings 112 spaced apart a distance which is the same as distance "b" for lines 92. Large plugger 103 has a pair of rings 113 spaced apart a distance the same as distance "c" for lines 93. Broad carver 104 has a pair of rings 114 spaced apart a distance the same as distance "d" for lines 94. Fine carver 105 had a pair of rings 115 spaced apart a distance the same as distance "e" for lines 95. Chisel 106 has a pair of rings 116 spaced apart a distance the same as distance "f" for lines 96. With this arrangement, tools 100–106 may be readily located at their proper tool-supporting station in order of use as shown in FIG. 9. IN addition, certain of tools 100–106 are longer than others and their working ends will overhang support members 32 and 34 different distances. That is, the working ends of certain tools are located at various positions intermediate tool supports 32 and 34, and sidewalls 18 and 29. Therefore, certain tools may be moved axially of their length while supported at a tool-supporting station before a working end strikes sidewall 18 or 20. With the arrangement described, the identical spacing of the lines on tray "a" and the rings on tools 100–106 prevents improper positioning of a tool at an incorrect station.

It will be recognized that the arrangement described defines an operating kit which is used for a particular operation. Any desirable color may be used for any particular operation. By way of example, let it be assumed that an amalgam operation is defined by a blue color. The exterior surface of tray "a" is then provided with painted blue symbols or is anodized a bluish finish while the interior surface is left a natural finish. Lines 90–96 are provided in the same blue color. In addition, rings 100–116 on tools 100–106 are also provided in a blue color. Accessory tray "b" is also molded from a blue-colored plastic material or is provided with blue color symbols on exterior surfaces thereof. For the amalgam operation, accessory tray "b" will include such materials as squeeze cloth, disposable capsule, amalgam gun, matrix bands and holders, wedges, cotton rolls and holders, articulating paper, and sandpaper discs and strips.

With the operating kit described, a dentist may simply request his assistant to prepare the operating area for an amalgam operation. The dentist himself may identify the color blue to the assistant or the assistant may consult an alphabetical list of index cards to determine the color for that type of operation. The same card may have a blue color code and contain a summary of procedures normally followed in performing that operation. The same card includes a list of materials required in the accessory tray so the assistant may consult the card to refill the accessory tray. The assistant then simply removes the metal tray A having a blue color identification and places it on a supporting surface adjacent the operating area. The assistant then removes the accessory tray B having a blue color identification and places it adjacent the operating area. The tools are already located in tray A and are arranged in a sequence corresponding to the order in which they are used. Once the amalgam operation on a patient has been completed, the blue tray and tools may be returned to a storage area for dirty tools and trays. When the tools and tray are cleaned and sterilized, the tools are readily returnable to a proper tray in a predetermined sequence by the different arrangement color identification on each tool and on the tray adjacent each tool-supporting station. A plurality of blue-colored trays and tools will normally be provided so that the amalgam operation may be performed on a successive number of patients without requiring sterilization of any equipment between patients.

A storage cabinet is preferably provided for a plurality of metal sterilizable tool trays A. One such cabinet arrangement is shown at C in FIG. 11. Such a cabinet may be provided with a sliding door 120. A plurality of vertically spaced horizontal supports, only two of which are referenced by numerals 122 and 124 in FIG. 11, are provided in cabinet C. A plurality of trays A and A' are removably supported within cabinet C on supports 122 and 124. Tray A' is identical to tray A but is provided with a different color identification for a different dental operation. For example, tray A' may carry a red color identification which corresponds to a silicate dental operation. Tray A' will carry the red color identification described with reference to tray A. In addition, tray A' is provided with red lines adjacent each tool-supporting station in the same manner as described with reference to tray A. A set of tools for the silicate operation may include a mirror, an explorer, a straight chisel, a curved chisel, a spoon instrument, a plastic instrument and a gethro knife. The sequence in which these tools are normally used is in the order of their identification. Each tool in this tool set is also provided with a red color identification ring in the same manner as described with reference to the tools of FIG. 8. The tools with the red color identification rings are positioned in the tray A' in their proper the tray in the same manner as described with reference to the tray A. In addition to tray A' and another set of tools carrying a red color identification for the silicate operation, an additional accessory tray B' is provided with the same red color identification. Tray B' is identical to tray B except for carrying a different color identification. Accessories normally required for the silicate operation are positioned in tray B' and these accessories include a silicate capsule, matrix bands and holders, rubber dam material, rubber dam clamps and holders, wedges, articulating paper, and sandpaper discs and strips. A plurality of trays B and B' may be supported in a cabinet D having a sliding door 126 and inwardly projecting horizontal supports 128 and 130. Peripheral flange 68 on tray B rests against the upper surfaces of supports 128 and 130 so that trays B and B' are removably supported within cabinet D. It will be recognized that a third operating kit may be provided with still a different color identification, such as yellow, for still a third type of dental operation. Still additional operating kits with other various color identifications may also be provided. Each kit for each type of operation carries a different color identification and each kit includes a set of tools, a sterilizable tool tray and an accessory tray all bearing a common color identification in each kit.

It will also be recognized that the arrangement of the present invention provides a plurality of tool trays and a plurality of tool trays and a plurality of accessory trays for use in performing dental operations. A first of the tool trays is provided with a first set of tools for performing an amalgam operation, while a second of the tool trays is provided with a second set of tools for performing a silicate operation. A first of the accessory trays is also provided with accessories for use in performing the amalgam operation, while a second of the accessory trays is provided with accessories for use in performing the silicate operation. Each of the first tool and accessory trays is provided with a common first color identification, while each of the second tool and accessory trays is provided with a second common color identification different from the first color identification. The first tool set is also provided with the first color identification so that sterilized tools may be removed from a sterilizer and readily returned to the proper tool tray. The second set of tools is also provided with the second color identification for the same purpose. In addition, each tool tray is provided with a plurality of spaced-apart tool-supporting stations and a color identification in a different arrangement is located adjacent each tool-supporting station. The color identification on each tool is also in a different arrangement and the arrangement on each tool corresponds to one arrangement adjacent one tool-supporting station in the tool tray.

Various arrangements may be provided for properly aligning the tools in a predetermined sequence in a toll tray. For example, FIG. 12 shows tray A having solid colored rectangles 140–146 of different width adjacent each tool-supporting station. Each tool 150–156 in FIG. 13 is then provided with a solid ring 160–166 with the ring being of progressively greater width on each tool, and with the width of each ring corresponding to the width of a rectangle adjacent one tool-supporting station.

It will be recognized that various tool alignment color identification arrangements may be provided in the trays and on the tools. For example, different combinations of lines and rectangles may be used. In addition, a progressively increasing number of lines and rings may be provided in the trays and on each tool in a set. Matching identification symbols may also be provided on tool supports 32 and 34 or on bottom 12 of tray between the tool supports and sidewalls 18 and 20. It is also possible to provide a single line on tray A adjacent each tool-supporting station with the lines extending in a diagonal pattern across tray A from divider 22 toward divider 24. Each tool in a tool set may then be provided with a single ring located at a different intermediate position. However, arrangements of the type described with reference to FIG. 7 and 12 are preferable because they are simpler and provide two way alignment. That is, the ring on each tool has two sides which must be properly aligned with the different spaced lines or edges of a rectangle when the tool is in its proper tool-supporting station. With a plurality of single lines arranged in a diagonal pattern at different distances intermediate tool support members 32 and 34, it is possible to place a tool at an improper station.

While the invention has been described with reference to a preferred embodiment, those skilled in the art will readily be aware of obvious modifications and alterations upon the reading and understanding of this specification. The present invention includes all equivalent modifications and alterations and is limited only by the scope of the claims.

1. A method of training a dental assistant in operating procedures involving the use of sterilizable metallic dental tool trays and nonmetallic accessory trays, comprising the steps of; providing a plurality of tool trays and a plurality of accessory trays, providing a first of said tool trays with a first set of tools for performing a first type of dental operation, providing a second of said tool trays with a second set of tools for performing a second type of dental operation, providing a first of said accessory trays with accessories for use in performing said first type of dental operation, providing a second of said accessory trays with accessories for use in performing said second type of dental operation, providing each of said first trays with a common first color identification, and providing each of said second trays with a common second color identification.

2. The method of claim 1 and further including the steps of providing each tool in said first set of tools with said first color identification, and providing each tool in said second set of tools with said second color identification.

3. The method of claim 1 and further including the steps of providing said first color identification in a different arrangement on each of said tools in said first set of tools, and providing said second color identification in a different arrangement on each of said tools in said second second set of tools.

4. The method of claim 3 wherein said tool trays include a plurality of spaced-apart tool-supporting stations and further including the steps of providing said first color identification on said first tool tray in a different arrangement adjacent each of said tool-supporting stations, each of said first color identification different arrangements on said first tray corresponding in shape with one of said different arrangement first color identifications on said first set of tools, and providing said second color identification on said second tool in a different arrangement adjacent each of said tool-supporting stations, each of said different arrangement second color identifications on said second tray corresponding with one of said different arrangement second color identifications on said second set of tools.

5. The method of claim 1 and wherein said tool trays include a plurality of spaced-apart tool-supporting stations and further including the steps of providing said first color identification on said first tool tray in a different arrangement adjacent each of said tool-supporting stations, and providing said second color identification on said second tool tray in a different arrangement adjacent each of said tool-supporting stations.

6. A method of training a dental assistant in operating procedures involving the use of a sterilizable metallic dental tool trays having a plurality of spaced-apart tool-supporting stations, comprising the steps of; providing a plurality of tool trays, providing a first of said trays with a first color identification on an exterior surface thereof, providing said first color identification in a different arrangement adjacent each of said tool-supporting stations on said first tray, providing a second of said trays with a second color identification on an exterior surface thereof, and providing said second color identification in a different arrangement adjacent each of said tool-supporting stations on said second tray.

7. The method of claim 6 and further including the steps of providing said first tray with a first set of tools for performing a first type of dental operation, providing each of said tools in said first set of tools with said first color identification in a different arrangement, each color identification arrangement on each of said tools corresponding with one color identification arrangement adjacent one of said tool-supporting stations on said first tray, providing a second set of tools for performing a second type of dental operation, and providing each of said tools with said first color identification in a different arrangement, each color identification arrangement on each of said tools corresponding with one color identification arrangement adjacent one of said tool-supporting stations on said second tray.

8. A rectangular dental tool tray having a bottom, first and second parallel spaced-apart sidewalls upstanding from said bottom, third and fourth parallel spaced-apart sidewalls upstanding from said bottom and extending perpendicular to said first and second sidewalls, tool support means in said tray for supporting a plurality to tools in parallel spaced-apart relationship between said first and second sidewalls, at least one of said sidewalls having tray color code means on its exterior surface, said tray including tool alignment color code means adjacent said tool support means, and said tray color code means being the same color as said tool alignment color code means.

9. The tray of claim 8 and further including a plurality of different tools supported by said support means, each of said tools having a tool color code thereon of the same color as said tray color code and said tool alignment color code.

10. The tray of claim 8 wherein said tool support means includes a plurality of spaced-apart tool-supporting stations and said tool alignment color code means is provided in a different arrangement adjacent each of said stations.

11. The tray of claim 19 and further including a plurality of different tools supported by said support means, each of said tools having a tool color code thereon in a different arrangement and of the same color as said tray color code and said tool alignment color code, each color code arrangement on each of said tools corresponding with one tool alignment color code arrangement one of said tool-supporting stations.

12. In a dental operating kit including a sterilizable metal tool tray, a set of dental tools for performing a predetermined dental operation, and a nonmetallic accessory tray for receiving accessories to be used in performing said operation, the improvement comprising; a common color identification symbol on said tool tray and said accessory tray and each of said tools in said set of tools.

13. The kit of claim 12 wherein said tool tray includes a plurality of spaced-apart tool-supporting stations, said common color identification symbol being located in a different arrangement adjacent each of said stations, said common color identification symbol on each of said tools in said set of tools being in a different arrangement and corresponding to one of said arrangements adjacent said stations.

* * * * *